(12) United States Patent
Gogolla et al.

(10) Patent No.: US 10,907,964 B2
(45) Date of Patent: Feb. 2, 2021

(54) METHOD FOR TRANSMITTING AN OBJECT ONTO A BOUNDARY SURFACE

(71) Applicant: Hilti Aktiengesellschaft, Schaan (LI)

(72) Inventors: Torsten Gogolla, Schaan (LI); Hanspeter Nuesch, Eschen (LI); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 588 days.

(21) Appl. No.: 15/538,998

(22) PCT Filed: Dec. 23, 2015

(86) PCT No.: PCT/EP2015/081102
§ 371 (c)(1),
(2) Date: Jun. 22, 2017

(87) PCT Pub. No.: WO2016/102637
PCT Pub. Date: Jun. 30, 2016

(65) Prior Publication Data
US 2017/0370719 A1 Dec. 28, 2017

(30) Foreign Application Priority Data
Dec. 23, 2014 (EP) .................................... 14200144

(51) Int. Cl.
*G01C 15/00* (2006.01)
(52) U.S. Cl.
CPC .................. *G01C 15/002* (2013.01)
(58) Field of Classification Search
None
See application file for complete search history.

(56) References Cited

U.S. PATENT DOCUMENTS

| 5,216,480 A | * | 6/1993 | Kaneko | ................... G01C 1/02 250/203.2 |
|---|---|---|---|---|
| 6,064,940 A | | 5/2000 | Rodgers et al. | |

(Continued)

FOREIGN PATENT DOCUMENTS

| DE | 100 34 035 A1 | 1/2002 |
|---|---|---|
| DE | 10 2006 025 881 A1 | 12/2007 |

(Continued)

OTHER PUBLICATIONS

Russian-language Search Report issued in counterpart Russian Application No. 2017126251/28 dated May 31, 2018 (2 pages).

(Continued)

*Primary Examiner* — Lina M Cordero
(74) *Attorney, Agent, or Firm* — Crowell & Moring LLP

(57) ABSTRACT

A method for transmitting objects onto a boundary surface by a system comprising a marking device having a print field, a locator device, and a control device is provided. The method includes selecting a first object to be marked having a first starting position and first target coordinates. The dimensions of the first object are bigger than the dimensions of the print field. The method also includes determining by the locator device a current position of the marking device, and determining by the control device a current print field of the marking device based on the current position of the marking device. The method also includes comparing by the control device the first starting position of the first object to the current print field of the marking device.

16 Claims, 5 Drawing Sheets

(56) References Cited

U.S. PATENT DOCUMENTS

| | | | |
|---|---|---|---|
| 6,373,244 B1 | 4/2002 | Nipp | |
| 6,588,868 B1 | 7/2003 | Skultety-Betz | |
| 8,368,875 B2* | 2/2013 | Kludas | G01C 15/002 356/3.01 |
| 8,699,005 B2* | 4/2014 | Likholyot | G01C 15/002 356/3.1 |
| 8,919,001 B2* | 12/2014 | Le Mer | B63B 71/00 33/286 |
| 8,943,701 B2* | 2/2015 | Hayes | G01B 11/14 33/280 |
| 2002/0005789 A1 | 1/2002 | Waibel et al. | |
| 2006/0259269 A1* | 11/2006 | Binder | B23Q 17/2428 702/155 |
| 2008/0027648 A1 | 1/2008 | Fujiwara et al. | |
| 2010/0026508 A1 | 2/2010 | Krapf et al. | |
| 2012/0158297 A1 | 6/2012 | Kim et al. | |
| 2013/0096873 A1* | 4/2013 | Rosengaus | G01C 15/002 702/151 |
| 2013/0184938 A1 | 7/2013 | Dolinar et al. | |
| 2013/0293705 A1* | 11/2013 | Schorr | G01B 11/24 348/135 |
| 2014/0210947 A1* | 7/2014 | Finn | G01C 15/002 348/46 |
| 2017/0026636 A1* | 1/2017 | Zahn | G01C 15/002 |

FOREIGN PATENT DOCUMENTS

| | | |
|---|---|---|
| DE | 20 2009 017 424 U1 | 6/2010 |
| DE | 20 2010 016 564 U1 | 3/2011 |
| EP | 0 952 465 A2 | 10/1999 |
| EP | 1 022 542 A1 | 7/2000 |
| JP | 4-39709 A | 2/1992 |
| RU | 2551396 C1 | 5/2015 |
| WO | WO 2009/009180 A2 | 1/2009 |
| WO | WO 2011/100535 A1 | 8/2011 |

OTHER PUBLICATIONS

International Search Report (PCT/ISA/210) issued in PCT Application No. PCT/EP2015/081102 dated Feb. 11, 2016 with English translation (5 pages).

German-language Written Opinion (PCT/ISA/237) issued in PCT Application No. PCT/EP2015/081102 dated Feb. 11, 2016 with English translation (11 pages).

International Search Report (PCT/ISA/210) issued in PCT Application No. PCT/EP2015/080974 dated Mar. 21, 2016 with English translation (5 pages).

German-language Written Opinion (PCT/ISA/237) issued in PCT Application No. PCT/EP2015/080974 dated Mar. 21, 2016 with English translation (11 pages).

International Search Report (PCT/ISA/210) issued in PCT Application No. PCT/EP2015/080983 dated Apr. 14, 2016 with English translation (5 pages).

German-language Written Opinion (PCT/ISA/237) issued in PCT Application No. PCT/EP2015/080983 dated Apr. 14, 2016 with English translation (10 pages).

Farr et al., "Three Dimensional Indoor Survey System", ANS Topical Meeting on Decommissioning, Decontamination, and Reutilization, Aug. 7, 2005, Denver, Colorado, four (4) pages total, XP055197179.

Russian-language Examination report issued in counterpart with Russian Application No. 2017126251/28 dated Jun. 9, 2018 (five (5) pages).

Russian-language Office Action issued in counterpart Russian Application No. 2017126245/28 dated May 31, 2018 (two (2) pages).

Russian-language Examination report issued in counterpart Russian Application No. 2017126245/28 dated Jun. 9, 2018 (five (5) pages).

Russian-language Office Action issued in counterpart Russian Application No. 2017126248/28 dated May 31, 2018 (two (2) pages).

* cited by examiner

METHOD FOR TRANSMITTING AN OBJECT ONTO A BOUNDARY SURFACE

This application claims the priority of International Application No. PCT/EP2015/081102, filed Dec. 23, 2015, and European Patent Document No. 14200144.5, filed Dec. 23, 2014, the disclosures of which are expressly incorporated by reference herein.

BACKGROUND AND SUMMARY OF THE INVENTION

The present invention relates to a method for transmitting an object onto a boundary surface by a marking device.

A known apparatus for transmitting an object onto a boundary surface by means of a marking device is disclosed in DE 20 2009 017 424 U1. The apparatus includes a marking device, a locator device and a control device. The user moves the marking device over the boundary surface. During the movement with the marking device, the locator device determines on a regular basis the current position of the marking device. The user can program a list of target points. The marking device can signal the proximity of the marking device by means of visual, acoustic, or haptic feedback. The known apparatus is not suited to transmit objects onto a boundary surface whose dimensions are greater than the dimensions of the print field of the marking device.

The object of the present invention is to develop a method for transmitting an object onto a boundary surface by a marking device, which is suited for objects whose dimensions are greater than the dimensions of the print field of the marking device.

According to one or more embodiments of the invention, the method for transmitting an object onto a boundary surface by an apparatus, which has a marking device including a print field, a locator device and a control device, is as follows:

In a first step, one selects a first object to be marked having a first starting position and first target coordinates, wherein the dimensions of the first object are greater than the dimensions of the print field, In a second step, a current position of the marking device is determined by the locator device and is transmitted to the control device, In a third step, a current print field of the marking device is determined by the control device from the current position of the marking device, and In a fourth step, the first starting position of the first object is compared by the control device against the current print field of the marking device.

The method according to the invention deals with transmitting known objects onto the surface boundary by the marking device. The term "object" includes all elements that may be arranged in a substrate, or elements that may be applied on a boundary surface. Examples of objects are door openings, the course of power lines, and the arrangement of reinforcing bars in an iron lattice.

A necessary prerequisite for the method according to the invention is that the target coordinates of the object to be marked are known; in addition, a starting position is to be established. The target coordinates may be on hand as absolute coordinates or relative coordinates in relation to a reference object. Of particular relevance to the application is the ability to check the information of a construction plan using the method according to the invention. A construction plan contains a plurality of objects with their object properties and target coordinates. The construction plan may be designed for the control device in a legible format to enable uploading the object data directly from the construction plan; otherwise, the object data must be entered manually by the user into the control device.

In a first step, one selects a first object to be marked having a first starting position and first target coordinates; the dimensions of the first object are greater than the dimensions of the print field. Before marking can take place, the marking device must be positioned over the first object. To do so, in a second step, the current position of the marking in the room is determined by the locator device. In a third step, the control device determines from the current position of the control device the current print field of the control device; the relationship between the current position and the print field of the detector device is known. Then in a fourth step, the control device compares the first starting position against the current print field of the marking device.

The subsequent steps of the method according to the invention depend on the comparison of the first starting position against the current print field of the marking device. In doing so, one differentiates between two variants. In a first variant, the first starting position is located outside of the current print field, and in a second variant, the first starting position is located within the current print field.

In the first variant, from the current position of the marking device and the first starting position of the first object, an adjustment instruction for the marking device is calculated by the control device and is depicted on a display device when the first starting position is located outside of the current print field.

In the second preferred variant, an operating instruction to stop the marking device is generated by the control device and depicted on a display device when the first starting position is located with the current print field.

In a particularly preferred embodiment, a command to mark the first object is issued by the control device to the marking device when the first starting position is located within the current print field and the marking device is not moved. The method has the advantage that the actuation of the marking is controlled by the control device.

In a particularly preferred embodiment, an adjustment instruction for the marking device is generated by the control device, during the marking process with the marking device, from the first target coordinates of the first object and the current position of the marking device, and the adjustment instruction is depicted on display device. Via the adjustment instruction, the user is instructed on how the marking device is to be moved over the boundary surface.

The current position of the marking device is determined using a locator frequency by the locator device and the position data is transmitted using a transmission frequency from the locator device to the control device.

If the first target coordinates of the first object are located outside of the current print field, the control device issues a command to the marking device to suspend the marking of a first object. The marking is only transmitted when the marking device is positioned correctly and the target coordinates are located in the print field of the marking device.

In a further embodiment, the method according to the invention, in the first step, one selects besides the first object a second object to be marked having a second starting position and second target coordinates and in a fourth step, besides the first starting position of the first object, the second starting position of the second object is compared by the control device against the current print field of the marking device. The method has the advantage that multiple objects can be transmitted to the boundary surface by the marking device. In a preparatory step, the user selects the objects to be marked and subsequently transmits the objects to the boundary surface.

In a first variant, a command is issued by the control device to the marking device to mark the first object when the first starting position is located within the current print field, or a command is issued for marking the second object when the second starting position is located within the current print field.

In a particularly preferred embodiment, after marking an object, an adjustment instruction for the marking device is calculated by the control device from the current position of the marking device and the starting position of the other object and is depicted on a display device.

In the second variant, a first and second distance is calculated by the control device from the current position of the marking device as well as the first and second starting position of the first and second object, when the first and second starting position are arranged outside of the current print field. In a particularly preferred embodiment, the first and second distance are compared against each other by the control device, and for the object with the smallest distance to the current position of the marking device an adjustment instructions is calculated by the control device for the marking device and is depicted on a display device.

For multiple objects to be marked, the distance of the starting position of the object to the current position of the marking device determines the sequence in which the objects are transmitted by the marking device onto the surface.

In a further embodiment, the method according to the invention is also characterized by a current orientation of the marking device also being determined in a second step by the locator device. In a particularly preferred embodiment, in the third step, the current print field of the marking device is determined from the current position and the current orientation of the marking device. By determining the current orientation, the accuracy with which the orientation of the marking device can be determined is increased. The current orientation of the marking device can be determined for example using a camera or by the differentiation among multiple known markings, which are applied on the marking device. Here, all known methods are suited for determining the orientation of an object in the room.

Preferably, the current orientation of the marking device is also taken into account in all method steps of the method according to the invention, which use the current position of the marking device.

Embodiments of the invention are described below by the drawing(s). It is intended to show the embodiments not necessarily to scale; rather the drawing, where useful for explanation purposes, is executed in a schematic and/or slightly distorted manner. Regarding amendments to the teachings directly evident from the drawing, one shall refer to the relevant prior art. In doing so, one shall take into account that diverse modifications and changes pertaining to the form and detail of an embodiment can be undertaken without departing from the general idea of the invention. The features of the invention disclosed in the description, drawing and claims may be essential both individually on their own as well as in any combination for the further development of the invention. Also falling within the scope of the invention are all combinations of at least two of the features disclosed in the description, drawing and/or claims. The general ideal of the invention is not restricted to the exact form or detail of the preferred embodiments depicted and described hereafter, or limited to a subject matter that would be restricted in comparison to the subject matter claimed in the claims. For given measurement ranges, values lying within the mentioned limits shall be disclosed as limit values and one shall be able to use and claim these as one wishes. For the sake of simplicity, the same reference signs are used for identical or similar parts, or parts with an identical or similar function.

DETAILED DESCRIPTION OF THE DRAWINGS

Figure 1:
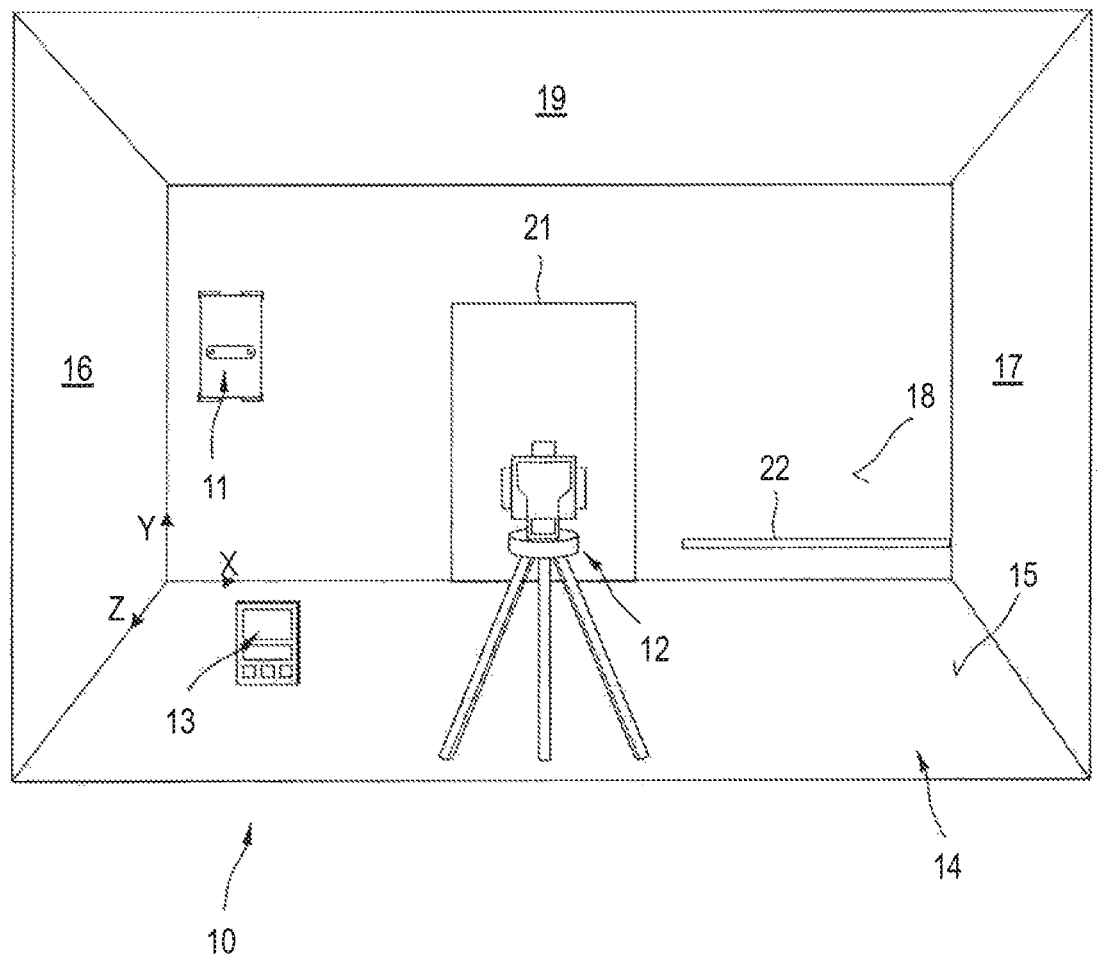
FIG. 1 illustrates the application of an apparatus for transmitting an object onto a boundary surface designed as a back wall with a marking device, a locator device and a control device.

FIG. 1 illustrates a device 10 for executing a method according to the invention for transmitting an object onto a boundary surface. The term "object" covers all elements that can be arranged in a substrate or elements that can be applied onto a boundary surface. Examples of objects are door openings, the routing of power supply lines, and the arrangement of reinforcing bars in an iron lattice. Apparatus 10 includes a marking device 11, a locator device 12, and a control device 13. In the embodiment of FIG. 1, marking device 11, a locator device 12, and a control device 13 are designed as separate components, which can be connected via communication lines and which can communicate with each other. Marking device 11 is designed as a hand-operated marking device, which is moved during the marking process over the boundary surface.

The method according to the invention is described by way of a task in an interior space 14. Interior space 14 consists of a floor 15, a left and right sidewall 16, 17, a back wall 18 and a ceiling 19. The boundaries 15-19 of interior space 14 are covered by the term "boundary surface". Interior space 14 is spanned by a three-dimensional coordinate system X, Y, Z, whose point of origin (0, 0, 0) is located in the left bottom corner between floor 15, left sidewall 16, and back wall 18. A door and a horizontal electric cable are to be installed in back wall 18. For the task, a door opening is defined as a first object 21 and a horizontal wall slit is defined as second object 22.

Figure 2:
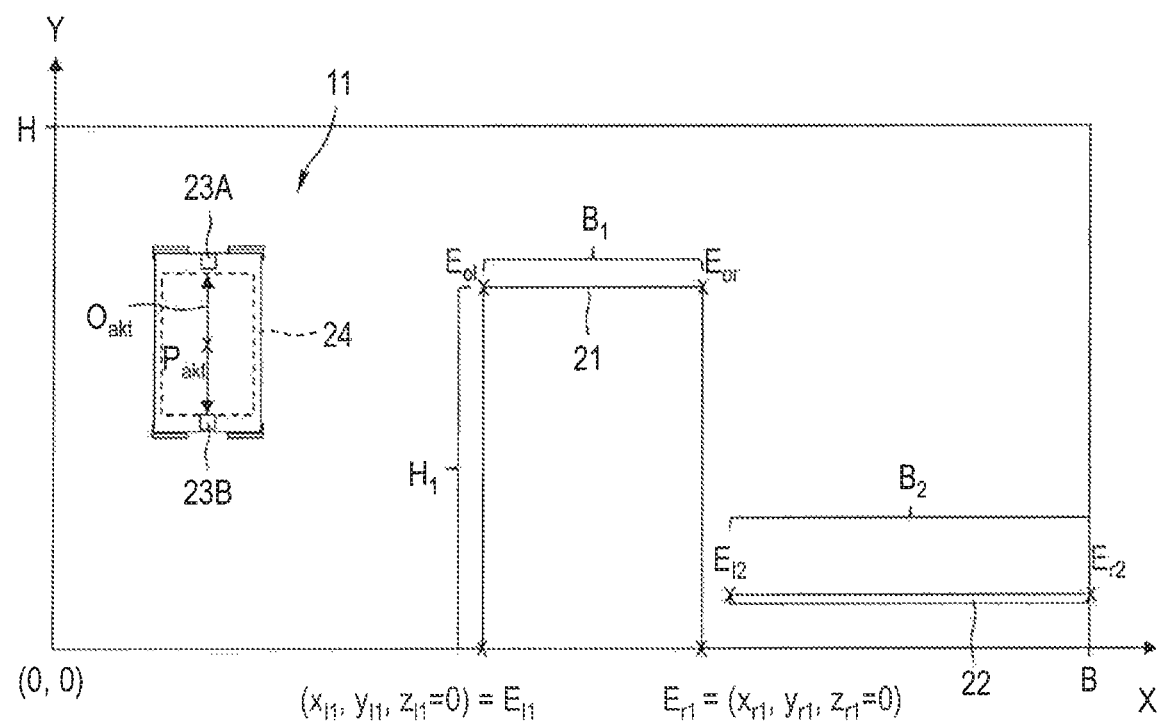
FIG. 2 illustrates the back wall of FIG. 1 with a first object to be marked and a second object to be marked.

FIG. 2 illustrates back wall 18 of interior space 14 with first object 21 to be marked and second object 22 to be marked. Back wall 18 lies in the XY plane of the coordinate system and it has a width B in direction X and a height H in direction Y.

Before a marking is made by marking device 11, marking device 11 must be positioned over first or second object 21, 22. To do so, using locator device 12, current position $P_{akt}$ is determined using coordinates $x_{akt}$, $y_{akt}$, $z_{akt}$ of marking device 11 in interior space 14. Current position $P_{akt}$ of marking device 11 is determined using two locator marks 23A, 23B. In the embodiment, locator marks 23A, 23B are applied on the top side of marking device 11. From current position $P_{akt}$ of marking device 11, control device 13 determines a current print field 24 of marking device 11. There is a known relationship between the positions of locator marks 23A, 23B and print field 24 of marking device 11. A current orientation $O_{akt}$ of marking device 11 may also be determined using locator marks 23A, 23B. After control device 13 has determined current print field 24 of marking device 11, the starting positions of objects 21, 22 are compared by control device 13 against current print field 24 of marking device 11.

Door opening 21 has a width $B_1$ in direction X and a height $H_1$ in direction Y. A right bottom endpoint $E_{r1}$ having coordinates $x_{r1}$, $y_{r1}$, $z_{r1}$ and a left bottom endpoint $E_{l1}$ having coordinates $x_{l1}$, $y_{l1}$, $z_{l1}$ are suited as a starting position for marking door opening 21. Based on starting positions $E_{l1}$, $E_{r1}$, the outer boundary of door opening 21 can be marked without interruption on back wall 18. The upper end points $E_{ol}$ and $E_{or}$ have coordinates $x_{l1}$, $y_{l1}+H_1$, $z_{l1}$ and $x_{l1}+B_1$, $y_{l1}+H_1$, $z_{l1}$ starting from the left bottom endpoint. Wall slit 22 is bounded by a left end point $E_{l2}$ having coordinates $X_{l2}$, $y_{l2}$, $Z_{l2}$ and a right end point $E_{r2}$ having coordinates $x_{r2}$, $y_{r2}$, $z_{r2}$ and has a width $B_2$ in direction X; it is oriented as a horizontal wall slit parallel to direction X. End points $E_{l2}$, $E_{r2}$ are suitable as a starting position for marking wall slit 22.

Figure 3:
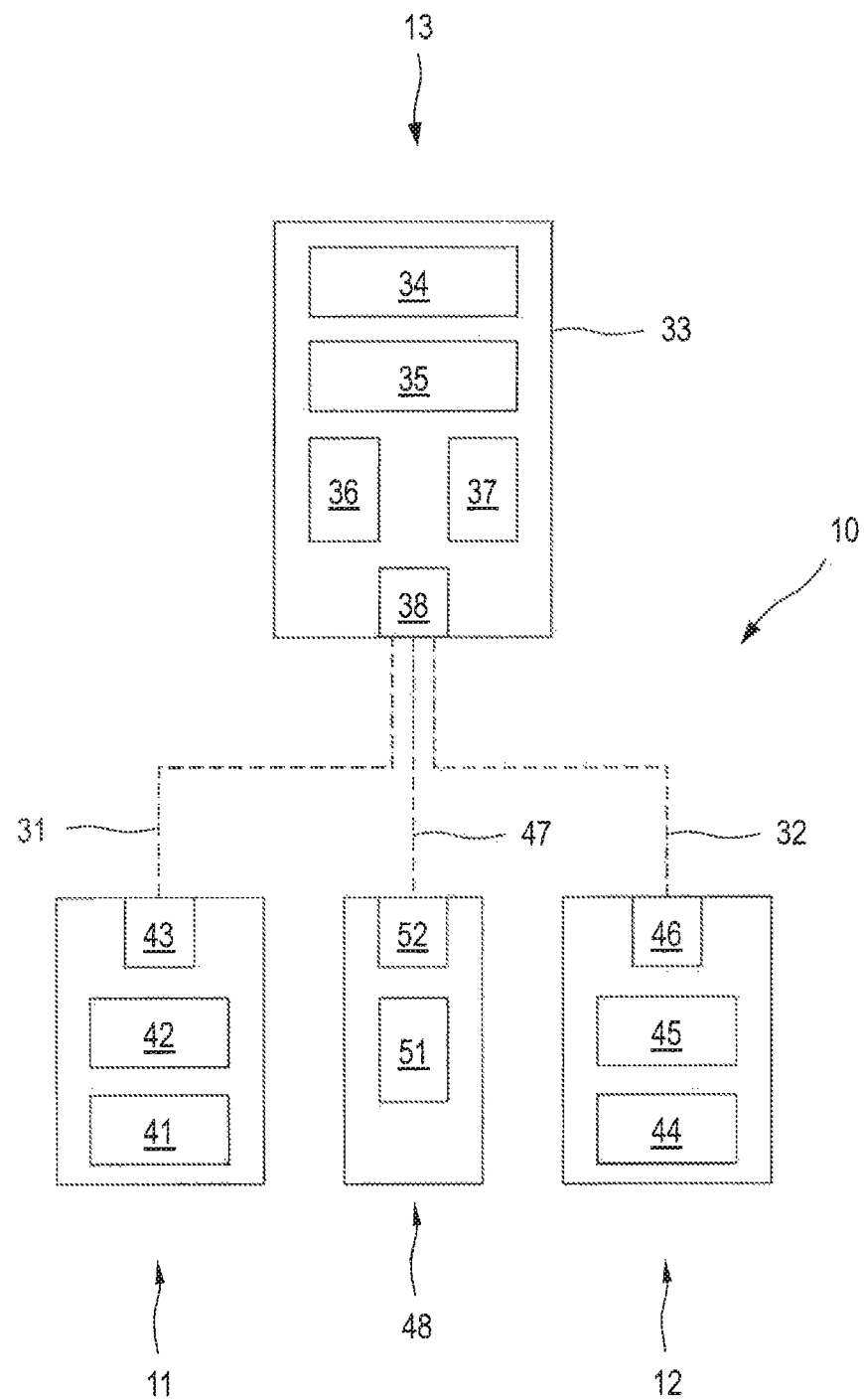
FIG. 3 illustrates the interaction of the marking device, the locator device, and the control device of the apparatus depicted in FIG. 1 in the form of a block diagram.

FIG. 3 illustrates the setup and interaction of marking device 11, locator device 12, and control device 13 in the form of a block diagram. Marking device 11, locator device 12, and control device 13 are designed in the embodiment as separate components, which can communicate with each other via communication links. Marking device 11 and control device 13 can be connected to each other via a first communications link 31. Control device 13 can be connected to locator device 12 via a second communications link 32. The communication links can be designed as wireless communication links, for example as radio, infrared, Bluetooth, WLAN or W-Fi links, or as cabled communication links.

Control device 13 includes a housing 33, into which is integrated an operating device 34 and a display device 35. Operating device 34 and display device 35 can be designed as separate parts as shown in FIG. 2 or jointly integrated into a touch screen for example. Control device 13 also has an evaluation and control element 36, a storage element 37 and a first transmit and receive element 38.

Marking device 11 includes a printing device 41, a control element 42 for controlling printing device 41 and a second transmit and receive element 43. Originating at first transmit and receive element 38 of control device 13, the first communications link to second transmit and receive element 43 of marking device 11 is set up. The commands for marking device 11 are transmitted by control device 13 via first communications link 31 to control element 42 of marking device 23.

Locator device 12 includes a measuring device 44, a control and evaluation element 45 for controlling measuring device 44 and for evaluating the measured values as well as a third transmit and receive element 46. Locator device 12 is designed for example as a total station and the measuring device 44 is designed as a distance and angle measuring device. Originating at first transmit and receive element 38 of control device 13, second communications link 32 to third transmit and receive element 46 of locator device is set up.

The objects to be marked may be selected from a construction plan and uploaded into control device 13. Construction plans may be stored in storage element 37 of control device 13 or control device 13 may be connected via a third communications link 47 to a central storage 48, which contains construction plans. The term "central storage" covers all electronic devices used for archiving data; included are servers, notebooks, computers, external hard drives and PDAs. Via third communications link 47, construction plans can be transmitted from central storage memory 48 to control device 13 and stored in storage element 37, or processed construction plans are transmitted by control device 13 to central storage 48 and archived there. Central storage 48 includes a storage device 51 and a fourth transmit and receive element 52. Originating from a first transmit and receive element 38 of control device 13, third communications link 47 to fourth transmit and receive element 52 of central storage 48 is set up.

Figure 4:
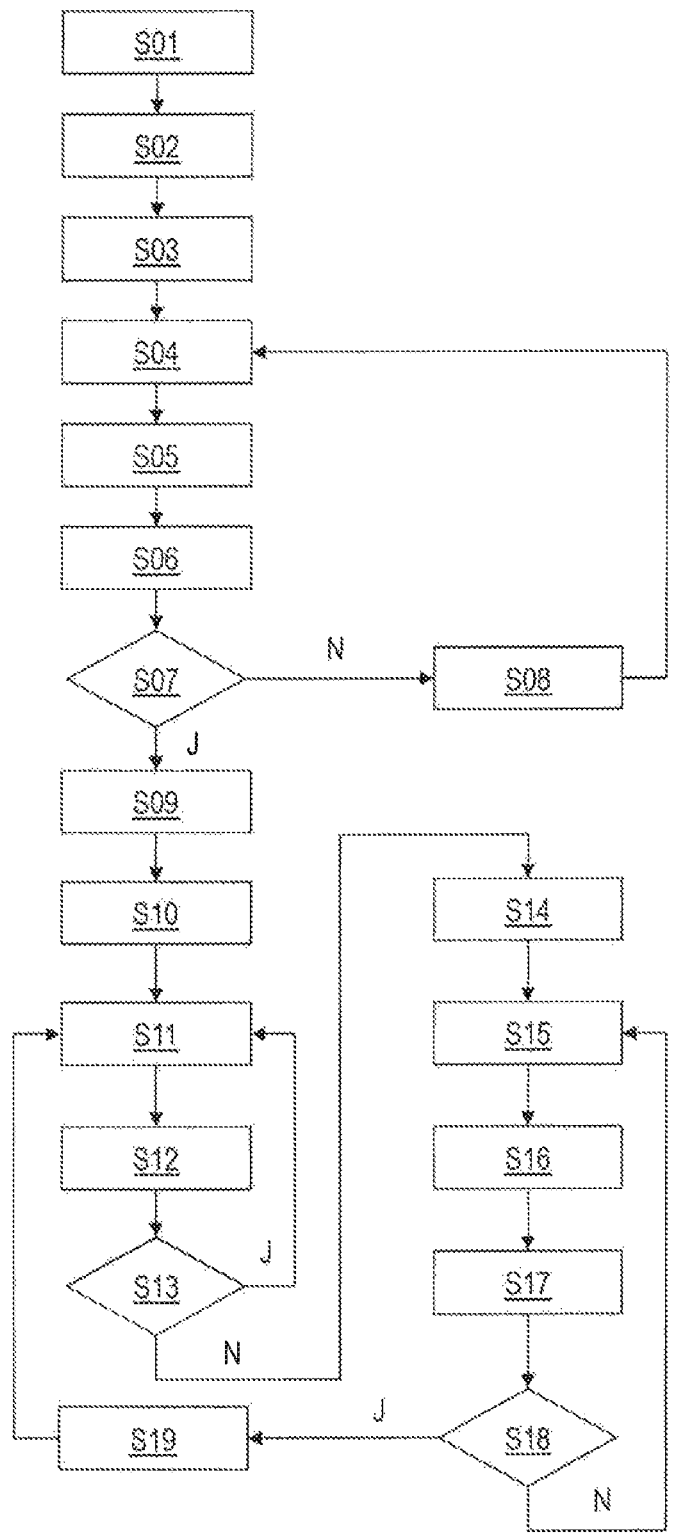
FIG. 4 illustrates a first embodiment of the method according to the invention for transmitting an object designed as a door entrance in the form of a flow chart.

FIG. 4 illustrates a first design variant of the method according to the invention for marking an object using a flow chart. The first design variant is described using a door opening 21, which forms the first object to be marked and is located in back wall 18 of interior space 14.

In a step S01, the user selects by operating device 34 door opening 21 having starting position $E_{l1}$ and target coordinates $E_{l1}$, $E_{r1}$, $E_{ol}$, $E_{or}$ on back wall 18. Prior to starting the process, the user can establish one of the end points $E_{l1}$, $E_{r1}$ as a starting position or control device 13 decides, while the process is being executed, which of the end points lies closer, and defines it as the starting position. In the embodiment of FIG. 4, left bottom end point $E_{l1}$ of door opening 21 is defined as the starting position.

In a step S02, door opening 21 is uploaded as the object to be marked into control device 13. In a step S03, the user begins to execute the process. After the start in step S03, locator device 12 determines in a step S04 the current position $P_{akt}$ and current orientation $O_{akt}$ of marking device 11 on back wall 18, which are transmitted in a step S05 by locator device 12 to control device 13. In a step S06, control device 13 determines from the current position and orientation $P_{akt}$, $O_{akt}$ the current print field 24 of marking device 11 and compares starting position $E_{l1}$ in a step S07 against current print field 24. In step S07, control device 13 thereby checks whether starting position $E_{l1}$ of object 21 is located within current print field 24.

If starting position $E_{l1}$ of object 21 is located outside of current print field 24 (N in S07), control device 13 generates in a step S08, from the current position and orientation $P_{akt}$, $O_{akt}$, an adjustment instruction, which is depicted on display device 35, for marking device 11. Subsequently, the process is continued with step S04. Steps S04 to S07 and S08 are consolidated as "target search" method step $V_1$.

If starting position $E_{l1}$ is located within current print field 24 (J in S07), in a step S09 control device 13 issues a command for marking object 21 to marking device 11, and in a step S10 determines from current position and orientation $P_{akt}$, $O_{akt}$ and target coordinates $E_{l1}$, $E_{r1}$, $E_{ol}$, $E_{or}$ of object 21 an adjustment instruction as to how marking device 11 is to be moved over object 21 to be marked. In a step S11, locator device 12 determines the current position and orientation $P_{akt}$, $O_{akt}$ using a locator frequency and transmits the position data to control device 13. In a step S12, control device 13 determines from current position and orientation $P_{akt}$, $O_{akt}$ current print field 24 and in a step S13 compares target coordinates $E_{l1}$, $E_{r1}$, $E_{ol}$, $E_{or}$ of object 21 to be marked against current print field 24.

If target coordinates $E_{l1}$, $E_{r1}$, $E_{ol}$, $E_{or}$ of object 21 to be marked are arranged within current print field 24 (J in S13), the method according to the invention is continued with step S11. If target coordinates $E_{l1}$, $E_{r1}$, $E_{ol}$, $E_{or}$ of object 21 to be marked are located outside of current print field 24 (N in S13), control device 13 issues in a step S14 a command to marking device 11 to discontinue marking object 21. In a step S15, control device 13 generates from current position and orientation $P_{akt}$, $O_{akt}$ of marking device 11 and target coordinates $E_{l1}$, $E_{r1}$, $E_{ol}$, $E_{or}$ of object 21 an adjustment instruction, which is depicted on display device 35. Current position and orientation $P_{akt}$, $O_{akt}$ of detector device 11 are determined in a step S16 by locator device 12 and transmitted to control device 13. In a step S17, control device 13 determines from current position and orientation $P_{akt}$, $O_{akt}$ of marking device 11 current print field 24 and in a step S18 compares the target coordinates of object 21 against current print field 24.

If the target coordinates of object 21 are located outside of current print field 24 (N in S18), the method according to the invention is continued with step S15. If the target coordinates of object 21 are located within current print field 24 (J in S18), control device 13 generates in a step S19 a command to marking device 11 to continue marking object 21. The process is subsequently continued with step S11.

Figure 5:
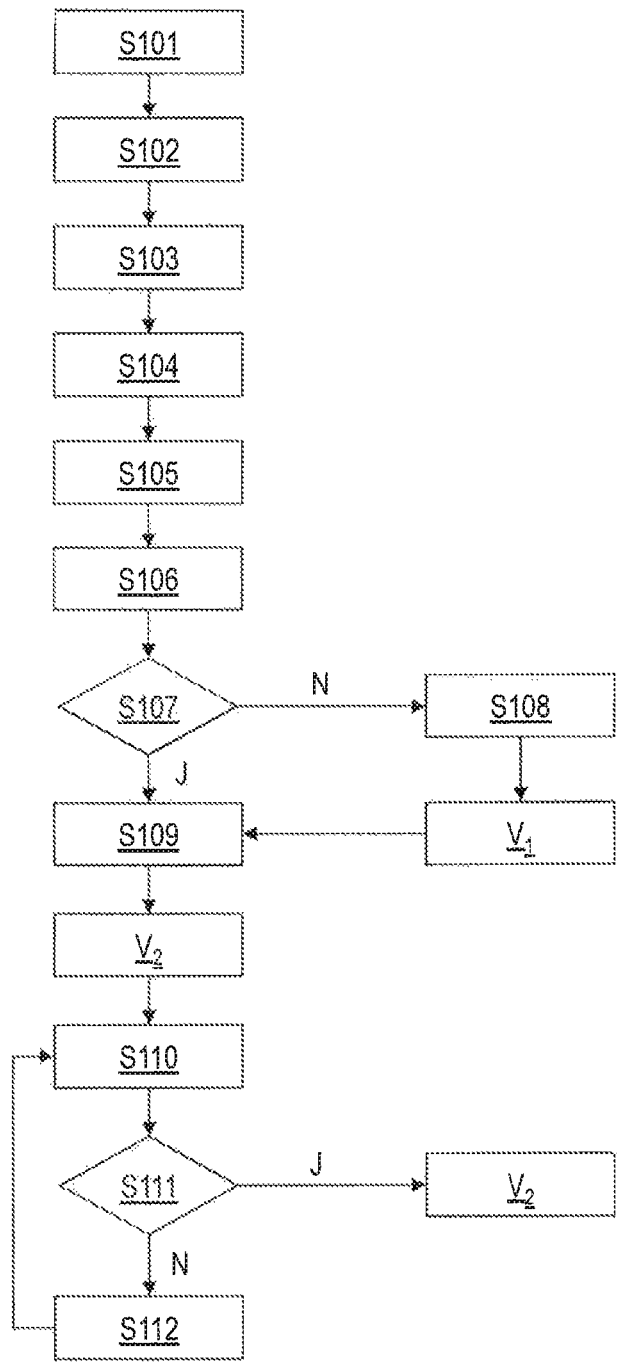
FIG. 5 illustrates a second design variant of the method according to the invention for transmitting a first object designed as a door entrance and a second object designed as a wall slit in the form of a flow chart.

FIG. 5 illustrates a second design variant of the method according to the invention for marking a first object and a second object using a flow chart. The second design variant is described using door opening 21, which forms the first object to be marked, and wall slit 22, which forms the second object to be marked. In doing so, door opening 21 and wall slit 22 are arranged in back wall 18 of interior space 14.

Prior to starting the process, the user can set the sequence, in which objects 21, 22 are transmitted on back wall 18, or control device 13 decides while the process is being executed which of the objects lies closer and is first transmitted to back wall 18. In the embodiment of FIG. 5, the distances between the starting positions and the current position of the marking device are determined.

In a step S101, the user selects door opening 21 having first starting position $E_{l1}$ and first target coordinates $E_{l1}$, $E_{r1}$, $E_{ol}$, $E_{or}$ as the first object and wall slit 22 having second starting position $E_{l2}$ and the second target coordinates $E_{l2}$, $E_{r2}$ as the second object; door opening 21 and wall slit 22 are uploaded in a step S102 as objects to be marked into control device 13. In a step S103, the user begins to execute the process.

After starting step S103, locator device 12 determines in a step S104 current position $P_{akt}$ and current orientation $O_{akt}$ of marking device 11 on back wall 18, which are transmitted in a step S105 from locator device 12 to control device 13. In a step S106, control device 13 determines current print field 24 of marking device 11 from current position and orientation $P_{akt}$, $O_{akt}$, and compares first and second starting positions $E_{l1}$, $E_{l2}$ in a step S107 against current print field 24. In step S107, control device 13 thereby checks whether first starting position $E_{l1}$ of first object 21 or second starting position $E_{l2}$ of second object 22 is located within current print field 24.

If first and second starting positions $E_{l1}$, $E_{l2}$ are located outside of current print field 24 (N in S107), control device 13 calculates in a step S108, from current position and orientation $P_{akt}$, $O_{akt}$ of marking device 11, a first distance $d_1$ to first starting position $E_{l1}$ and a second distance $d_2$ to second starting position $E_{l2}$ and generates for the object with the smaller distance an adjustment instruction, which is depicted on display device 35, for marking device 11. For the object with the smaller distance, "target search" method step $V_1$ is carried out; the steps of method step $V_1$ correspond to steps S04 to S08.

If the first starting position $E_{l1}$ of first object 21 or second starting position $E_{l2}$ of second object are located within current detection field 24 (J in S107), control device 13 issues in a step S109 a command to marking device 11 to execute the marking of the corresponding object. The additional method steps that are carried out when marking the object correspond to steps S10 to S19, which are consolidated as "target guidance" method step $V_2$.

After the first of the two objects 21, 22 are marked on back wall 18, the process is continued for the second of the two objects 22, 21. In a step S110, control device 13 determines from current position and orientation $P_{akt}$, $O_{akt}$ of marking device 11 the current print field 24 and in a step S111, it determines whether the starting position is located within current print field 24.

If the starting position is located outside of current print field 24 (N in S111), control device 13 generates in a step S112, from current position and orientation $P_{akt}$, $O_{akt}$ of marking device 11 and the starting position, an adjustment instruction, which is depicted on display device 35, for marking device 11; the method according to the invention is continued with step S110. If the starting position is located within current print field 24 (J in S111), the method according to the invention is continued with "target guidance" method step $V_2$.

The invention claimed is:

1. A method for marking objects on a boundary surface by an apparatus, the boundary surface being a boundary of an interior space limited by a floor, one or more walls, and/or a ceiling, and the apparatus having a marking device comprising a print field and a control element for controlling the print field, a locator device, and a control device, the method comprising the steps of:
    selecting a first object to be marked, the first object having a first starting position and first target coordinates, wherein the first starting position and the first target coordinates are known in a coordinate system of the interior space and dimensions of the first object are larger than dimensions of the print field of the marking device;
    determining by the locator device a current position of the marking device and transmitting the current position of the marking device to the control device;
    determining by the control device a current print field of the marking device on the boundary surface from the current position of the marking device;
    comparing by the control device the first starting position of the first object against the current print field of the marking device on the boundary surface; and
    issuing by the control device a command for marking the first object to the marking device, and marking the first object on the boundary surface by the marking device when the first starting position is located within the current print field of the marking device on the boundary surface.

2. The method according to claim 1, further comprising the steps of:
    based on the current position of the marking device and the first starting position of the first object, calculating by the control device an adjustment instruction for the marking device; and depicting the adjustment instruction on a display device when the first starting position is located outside of the current print field.

3. The method according to claim 1, further comprising the step of:
generating by the control device a command for stopping the marking device and depicting the command on a display device when the first starting position is located within the current print field.

4. The method according to claim 1, further comprising the step of:
issuing by the control device a command to the marking device for marking the first object when the first starting position is located within the current print field and the marking device is not moved.

5. The method according to claim 4, further comprising the step of:
issuing a command by the control device to the marking device to discontinue the marking of the first object if the first target coordinates of the first object are located outside of the current print field.

6. The method according to claim 4, further comprising the steps of:
generating by the control device an adjustment instruction for the marking device during the marking process using the marking device from the first target coordinates of the first object and the current position of the marking device; and
depicting the adjustment instruction for the marking device on a display device.

7. The method according to claim 6, wherein the current position of the marking device is determined by the locator device using a locator frequency and position data is transmitted using a transmission frequency by the locator device to the control device.

8. The method according to claim 1, further comprising the steps of:
generating by the control device an adjustment instruction for the marking device from the first target coordinates of the first object and the current position of the marking device during the marking process using the marking device; and
depicting the adjustment instruction for the marking device on a display device.

9. The method according to claim 8, wherein the current position of the marking device is determined by the locator device using a locator frequency, and position data is transmitted using a transmission frequency by the locator device to the control device.

10. The method according to claim 1, further comprising the steps of:
selecting a second object to be marked, the second object having a second starting position and second target coordinates; and
comparing by the control device the second starting position of the second object against the current print field of the marking device.

11. The method according to claim 10, wherein the control device issues to the marking device a command to mark the first object if the first starting position is located within the current print field, or a command is issued to mark the second object if the second starting position is located within the current print field.

12. The method according to claim 11, further comprising the steps of:
calculating by the control device an adjustment instruction for the marking device after marking one of the first object or the second object from the current position of the marking device and a starting position of another object; and
depicting the adjustment instruction for the marking device on a display device.

13. The method according to claim 10, further comprising the steps of:
calculating by the control device a first distance from the current position of the marking device and the first starting position of the first object when the first starting position is located outside of the current print field of the marking device; and
calculating by the control device a second distance from the current position of the marking device and the second starting position of the second object when the second starting position is located outside of the current print field of the marking device.

14. The method according to claim 13, wherein the first distance and the second distance are compared by the control device against each other and further comprising the steps of:
calculating by the control device an adjustment instruction for the marking device for an object with the smallest distance to the current position of the marking device; and
depicting the adjustment instruction for the marking device on a display device.

15. The method according to claim 1, wherein a current orientation of the marking device is determined by the locator device.

16. The method according to claim 15, wherein the current print field of the marking device is determined from the current position and the current orientation of the marking device.

* * * * *